us011463373B2

United States Patent
Nakashima

(10) Patent No.: US 11,463,373 B2
(45) Date of Patent: Oct. 4, 2022

(54) IN-VEHICLE COMMUNICATION SYSTEM, RELAY DEVICE, AND COMMUNICATION METHOD

(71) Applicant: DENSO CORPORATION, Kariya (JP)

(72) Inventor: Yuuta Nakashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/504,960

(22) Filed: Oct. 19, 2021

(65) Prior Publication Data

US 2022/0038387 A1 Feb. 3, 2022

Related U.S. Application Data

(63) Continuation of application No. PCT/JP2020/007946, filed on Feb. 27, 2020.

(30) Foreign Application Priority Data

May 8, 2019 (JP) .............................. JP2019-088609

(51) Int. Cl.
*H04L 43/10* (2022.01)
*H04L 47/74* (2022.01)
(Continued)

(52) U.S. Cl.
CPC .......... *H04L 47/746* (2013.01); *B60R 16/023* (2013.01); *H04L 12/28* (2013.01); *H04L 41/0659* (2013.01); *H04L 41/0686* (2013.01); *H04L 43/022* (2013.01); *H04L 43/0811* (2013.01); *H04L 43/0817* (2013.01); *H04L 43/0835* (2013.01); *H04L 43/10* (2013.01)

(58) Field of Classification Search
CPC ....... B60R 16/023; H04L 12/28; H04L 12/40; H04L 12/46; H04L 41/0659; H04L 41/0686; H04L 47/746; H04L 69/40; B60C 19/00; H04N 1/001; H04W 4/44; H04W 88/06
See application file for complete search history.

(56) References Cited

U.S. PATENT DOCUMENTS

| 2003/0055946 A1* | 3/2003 | Amemiya ............... H04L 69/40 |
| | | 709/224 |
| 2004/0130442 A1* | 7/2004 | Breed .................... B60C 19/00 |
| | | 340/449 |

(Continued)

FOREIGN PATENT DOCUMENTS

JP 2013236184 A 11/2013

*Primary Examiner* — Le H Luu
(74) *Attorney, Agent, or Firm* — Harness, Dickey & Pierce, P.L.C.

(57) ABSTRACT

A relay device directly connected to end nodes in an in-vehicle network transmits a failure detection packet to each end node. When each end node can receive the failure detection packet, each end node transmits a response to the relay device. When the relay device receives the response, the relay device transmits another failure detection packet. The end node determines that the in-vehicle network is normal when the value of the previous failure detection packet does not match the value of the other failure detection packet, and determines that the in-vehicle network is not normal when the value of the previous failure detection packet matches the value of the other failure detection packet.

9 Claims, 7 Drawing Sheets

(51) Int. Cl.
*H04L 41/0659* (2022.01)
*H04L 43/022* (2022.01)
*H04L 43/0829* (2022.01)
*B60R 16/023* (2006.01)
*H04L 12/28* (2006.01)
*H04L 43/0817* (2022.01)
*H04L 41/0686* (2022.01)
*H04L 43/0811* (2022.01)

(56) References Cited

U.S. PATENT DOCUMENTS

| | | | |
|---|---|---|---|
| 2009/0252044 A1* | 10/2009 | Bhaskaran | H04L 43/0811 370/248 |
| 2010/0007914 A1* | 1/2010 | Watanabe | H04N 1/001 358/1.15 |
| 2012/0099572 A1* | 4/2012 | Kato | H04W 88/06 370/338 |
| 2018/0103355 A1* | 4/2018 | Hergesheimer | H04W 4/44 |
| 2019/0025415 A1* | 1/2019 | Suchy | G01S 7/53 |
| 2019/0230014 A1* | 7/2019 | Ishizuka | H04L 43/10 |
| 2020/0410785 A1* | 12/2020 | Kawauchi | H04L 12/40 |
| 2021/0105324 A1* | 4/2021 | Iwata | H04L 12/46 |

* cited by examiner

| NUMBER OF IN-VEHICLE DEVICES | | NUMBER OF NECESSARY COMMUNICATION PATHS | |
|---|---|---|---|
| RELAY DEVICES 10 (NUMBER OF DEVICES 10) | END NODES 20 (NUMBER OF DEVICES 20) | IN-VEHICLE COMMUNICATION SYSTEM 1 | CONCEIVABLE TECHNIQUE |
| 2 | 6 | 4 | 15 |
| 3 | 9 | 11 | 36 |
| 4 | 12 | 18 | 66 |
| 10 | 30 | 75 | 435 |

STAR TYPE

RING TYPE

MESH TYPE

IN-VEHICLE COMMUNICATION SYSTEM, RELAY DEVICE, AND COMMUNICATION METHOD

CROSS REFERENCE TO RELATED APPLICATION

The present application is a continuation application of International Patent Application No. PCT/JP2020/007946 filed on Feb. 27, 2020, which designated the U.S. and claims the benefit of priority from Japanese Patent Application No. 2019-088609 filed on May 8, 2019. The entire disclosures of all of the above applications are incorporated herein by reference.

TECHNICAL FIELD

The present disclosure relates to an in-vehicle communication system, a relay device, and a communication method.

BACKGROUND

A conceivable technique provides an in-vehicle network system in which a plurality of information processing devices mounted on a vehicle are connected to a network such as a multiplex communication line. It is known that an information processing device, which is an end node of a network system, determines a communication state between end nodes. Specifically, it is known that the communication status between end nodes is determined whether the end node can send an ICMP (Internet Control Message Protocol) Echo Request (hereinafter, echo request) to another end node, and receive the response, i.e., ICMP Echo Reply (hereinafter, echo response).

SUMMARY

According to an example, a relay device directly connected to end nodes in an in-vehicle network transmits a failure detection packet to each end node. When each end node can receive the failure detection packet, each end node transmits a response to the relay device. When the relay device receives the response, the relay device transmits another failure detection packet. The end node determines that the in-vehicle network is normal when the value of the previous failure detection packet does not match the value of the other failure detection packet, and determines that the in-vehicle network is not normal when the value of the previous failure detection packet matches the value of the other failure detection packet.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
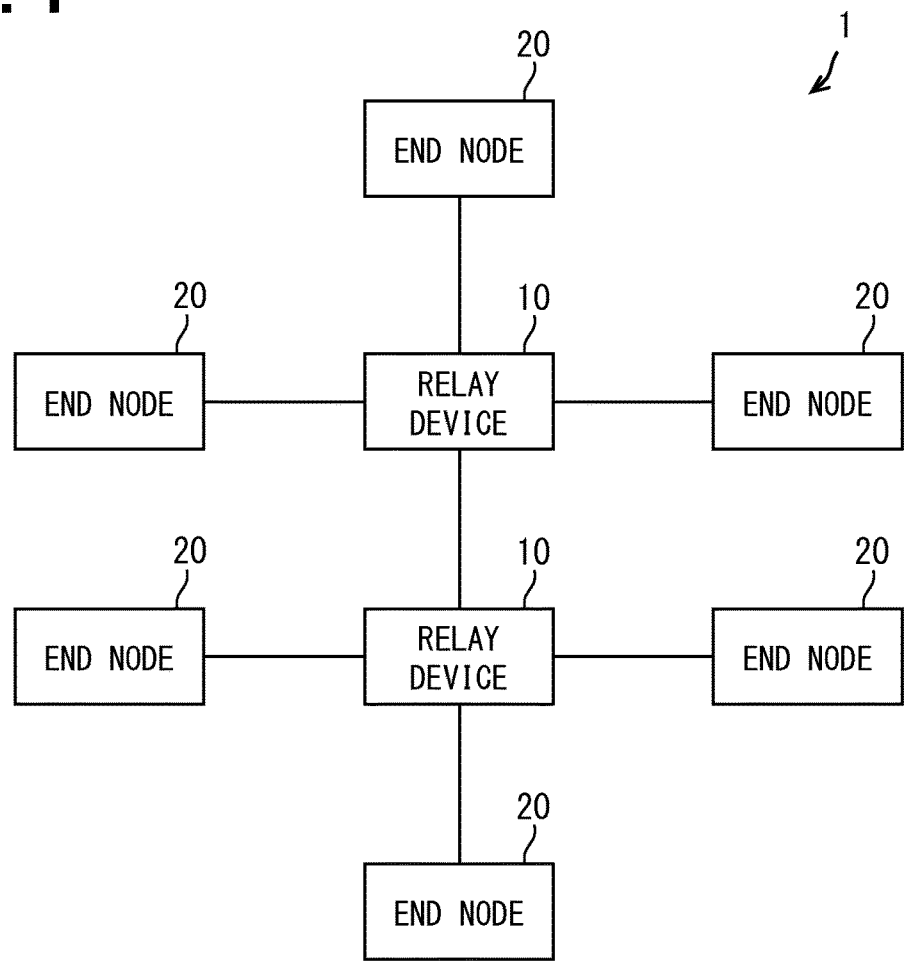
FIG. 1 is a diagram showing an example of a schematic configuration of an in-vehicle communication system.

Since the in-vehicle network system (hereinafter, in-vehicle network) handles signals related to vehicle control, it is required to determine the communication state of the in-vehicle network more quickly. However, in the conceivable technique, when the communication state is determined between the end nodes, the end nodes need to transmit and receive signals four times. Specifically, the second end node receives the echo request transmitted from the first end node, sends an echo response from the second end node to the first end node, and the first end node sends the echo request to the second end node, and the second end node receives the echo response transmitted from the first end node with respect to the echo request, so that the transmission and reception are performed four times.

In view of the above points, an in-vehicle communication system, a relay device, and a communication method are provided such that enable each end node to determine the communication state of the in-vehicle network more quickly than that the end nodes can determine the communication state of the in-vehicle network to each other.

The in-vehicle communication system of the present embodiments includes: a plurality of end nodes as information processing devices included in the in-vehicle network and used for a vehicle; and a relay device directly connected to the plurality of end nodes. In the in-vehicle communication system including the above, the relay device includes: a request transmitting unit for transmitting a failure detection packet, which is a packet for detecting the communication status, to each end node; and a response receiving unit for receiving the response from the end node that can receive the failure detection packet. When the response receiving unit receives a response from an end node, the request transmitting unit transmits another failure detection packet having a different value from the previously transmitted failure detection packet to the end node to which the previously transmitted failure detection packet is received. The end node includes: a request receiving unit for receiving the fault detection packet transmitted from the relay device; a response transmitting unit for transmitting the response to the relay device when the request receiving unit can receive the fault detection packet; and a communication status determination unit for determining that the communication status of the in-vehicle network is normal when the value of the previous failure detection packet received by the request receiving unit before the response transmitting unit transmits the response does not match the value of the current failure detection packet received by the request receiving unit after the response transmitting unit transmits the response, and for determining that the communication status of the in-vehicle network is abnormal when the value of the previous failure detection packet does not match the value of the current failure detection packet.

The communication method of the present embodiments includes: transmitting the failure detection packet, which is a packet for detecting the communication status, to each end node by the relay device directly connected to a plurality of end nodes as information processing devices included in an in-vehicle network; transmitting the response to the relay device by the end node when the end node can receive the failure detection packet transmitted from the relay device; transmitting another failure detection packet having the value different from the value of the previously transmitted failure detection packet to the end node to which the relay device transmits the previously transmitted failure detection packet when the relay device receives the response from the end node; determining that the communication status of the in-vehicle network is normal when the value of the previous failure detection packet received by the end node before the end node transmits the response does not match the value of the current failure detection packet received by the end node after the end node transmits the response; and determining that the communication status of the in-vehicle network is abnormal when the value of the previous failure detection packet does not match the value of the current failure detection packet.

According to these, when the relay device receives the response with respect to the failure detection packet transmitted last time from the end node, the relay device sends the failure detection packet having a different value from the failure detection packet transmitted last time to the end node to which the relay device sent the failure detection packet last time. Therefore, if there is no abnormality in the communication state with the relay device, the end node receives the failure detection packet having a different value from the previously received failure detection packet. Thus, in the end node, when the value of the previous failure detection packet received before sending the response does not match the value of the current failure detection packet received after sending the response, the end node determines that there is no abnormality in the communication status of the network. When the values match, the end node determines that there is an abnormality in the communication status of the in-vehicle network. Therefore, it becomes possible to determine the communication state of the in-vehicle network at the end node.

Since a plurality of end nodes are directly connected to the relay device, it is possible to determine the communication status of the in-vehicle network individually from each of the plurality of end nodes. In addition, the transmission and reception until the end node determines the communication status of the in-vehicle network is performed three times at most such as the reception of the failure detection packet from the relay device, the transmission of the response to the relay device, and the reception of the failure detection packet having the value different from the value of the failure detection packet received last time from the relay device. Therefore, the number of times is less than four times when the communication state of the in-vehicle network is determined between the end nodes. As a result, it becomes possible to determine the communication status of the in-vehicle network by individual end node more quickly than a case where the communication status of the in-vehicle network is determined between the end nodes.

The relay device of the present embodiments is used in a vehicle and directly connected to a plurality of end nodes as information processing devices included in an in-vehicle network. The relay device includes: a request transmission unit that transmits a failure detection packet, which is a packet for detecting a communication status, to an end node; and a response reception unit that receives a response transmitted from the end node that can receive the failure detection packet. When the response reception unit receives a response from the end node, the request transmitting unit transmits the failure detection packet having a different value from the previously transmitted failure detection packet to the end node to which the relay device previously transmits the failure detection packet.

According to these, when the relay device receives the response with respect to the failure detection packet transmitted last time from the end node, the relay device sends the failure detection packet having a different value from the failure detection packet transmitted last time to the end node to which the relay device sent the failure detection packet last time. Therefore, if there is no abnormality in the communication state with the relay device, the end node receives the failure detection packet having a different value from the previously received failure detection packet. Therefore, at the end node, it becomes possible to determine whether or not there is an abnormality in the communication status of the in-vehicle network by checking whether the value of the previous failure detection packet received before sending the response matches the value of the current failure detection packet received after sending the response. Since a plurality of end nodes are directly connected to the relay device, it is possible to determine the communication status of the in-vehicle network individually from each of the plurality of end nodes. In addition, the transmission and reception until the end node determines the communication status of the in-vehicle network is performed three times at most such as the reception of the failure detection packet from the relay device, the transmission of the response to the relay device, and the reception of the failure detection packet having the value different from the value of the failure detection packet received last time from the relay device. Therefore, the number of times is less than four times when the communication state of the in-vehicle network is determined between the end nodes. As a result, it becomes possible to determine the communication status of the in-vehicle network by individual end node more quickly than a case where the communication status of the in-vehicle network is determined between the end nodes.

Multiple embodiments will be described for disclosure hereinafter with reference to the drawings. For convenience of description, the parts having the same functions as the parts shown in the drawings used in the description up to that point in multiple embodiments may be designated by the same reference numerals and the description thereof may be omitted. Description in another applicable embodiment may be referred to for such a portion denoted by the identical reference sign.

Embodiment 1

<Outline Configuration of In-Vehicle Communication System 1>

The following will describe a first embodiment of the present disclosure with reference to the accompanying drawings. First, the in-vehicle communication system 1 will be described with reference to FIG. 1. The in-vehicle communication system 1 is mounted on a vehicle, and includes a plurality of relay devices 10 and a plurality of end nodes 20 as shown in FIG. 1.

The end node 20 is an information processing device used in a vehicle. An ECU is an example of the end node 20. In the following, a case where the end node 20 is an ECU will be described as an example. The end node 20 includes a processor, a memory, I/O, and a bus connecting them. The end node 20 exerts a function corresponding to the control program by executing the control program stored in the memory. The memory referred to here is a non-transitory tangible storage medium for storing programs and data that can be read by a computer non-transitory way. The non-transitory tangible storage medium is embodied by a semiconductor memory or a magnetic disk. The details of the end node 20 will be described later.

The relay device 10 relays the communication between the end nodes 20. The relay device 10 is connected to the end node 20 and another relay device 10 by a communication line. The connection form between the relay devices 10 may be any of a star type, a ring type, and a mesh type. As shown in FIG. 1, the relay device 10 is directly connected to a plurality of end nodes 20. FIG. 1 shows an example in which two relay devices 10 are directly connected to three end nodes 20 respectively. The communication network of the relay device 10 and the end node 20 connected by the communication line corresponds to the in-vehicle network. The example shown in FIG. 1 is merely an example, and the number of relay devices 10 included in the in-vehicle communication system 1 may be three or more. Further, the number of end nodes 20 directly connected to the relay device 10 may be a plurality other than two.

The relay device 10 includes a processor, a memory, I/O, and a bus connecting them. The relay device 10 exerts a function corresponding to the control program by executing the control program stored in the memory. For example, the relay device 10 executes a process related to the determination of the communication state of the in-vehicle network (hereinafter, the determination related process on the relay device side) by executing the control program. The memory referred to here is a non-transitory tangible storage medium for storing programs and data that can be read by a computer non-transitory way. The non-transitory tangible storage medium is embodied by a semiconductor memory or a magnetic disk. The details of the relay device 10 will be described below.

<Outline Configuration of Relay Device 10>

Figure 2:
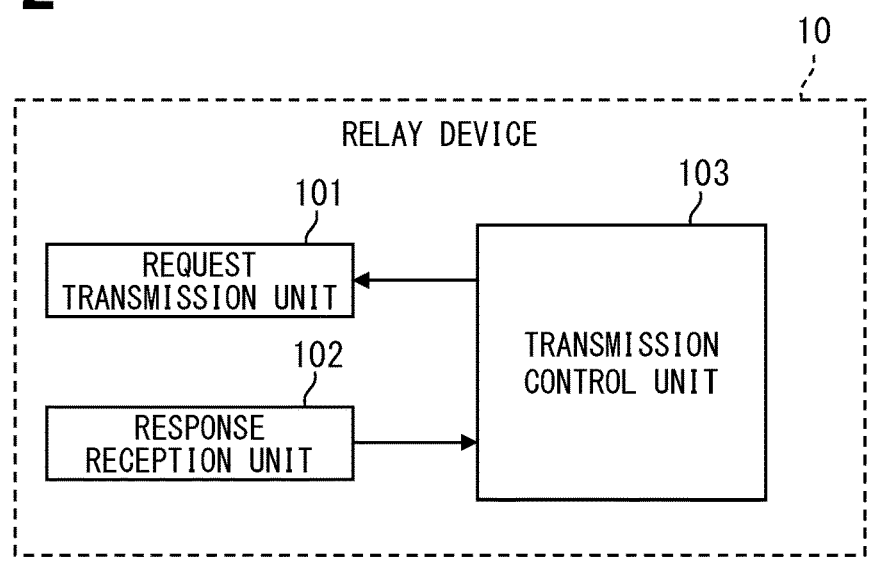
FIG. 2 is a diagram illustrating one example of a schematic configuration of a relay device.

Subsequently, the schematic configuration of the relay device 10 will be described with reference to FIG. 2. In FIG. 2, for convenience, the configurations other than those related to the determination-related process on the relay device side are not shown. The relay device 10 includes a request transmission unit 101, a response reception unit 102, and a transmission control unit 103 as functional blocks. A part or all of the functions executed by the relay device 10 may be configured in hardware by one or multiple ICs or the like. A part or all of the functional blocks included in the relay device 10 may be realized by a combination of execution of software by a processor and hardware members.

The request transmission unit 101 transmits a packet for detecting the communication status (hereinafter referred to as a failure detection packet) to the end node 20 which is directly connected by the communication line. In the following, a case where the in-vehicle communication system 1 provides ICMP (Internet Control Message Protocol), which is an Internet control notification protocol, will be described as an example. Therefore, in the following, the failure detection packet will be described as an ICMP message (hereinafter, simply echo request) in which the type of the ICMP packet is an echo request. This echo request corresponds to an echo request notification. As an example, the request transmission unit 101 may sequentially transmit echo requests to two end nodes 20 among a plurality of end nodes 20 directly connected to the relay device 10. Further, the request transmission unit 101 may sequentially transmit echo requests to a plurality of end nodes 20 directly connected to the relay device 10.

Figure 3:
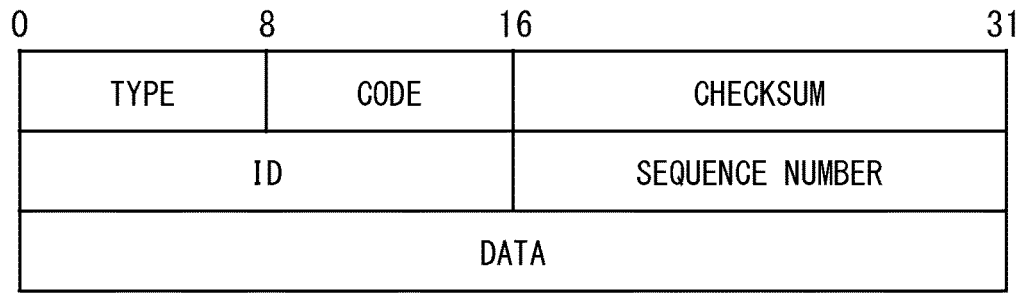
FIG. 3 is a diagram showing an example of a data structure of an ICMP message.

The data structure of the ICMP packet includes an IP header and an ICMP message. As shown in FIG. 3, the ICMP message includes fields such as "type", "code", "checksum", "ID", "sequence number", and "data". The "Type" is the value of the function type of the ICMP message. The "ID" is a value arbitrarily set by the transmission source. The "sequence number" is a serial number when repeatedly transmitting packets with the same ID. The "Data" corresponds to the payload.

The response receiving unit 102 receives the response transmitted from the end node 20 that has been able to receive the echo request transmitted from the request transmitting unit 101. This response is an ICMP message (hereinafter, simply echo response) in which the type of the ICMP packet is an echo response. This echo response corresponds to an echo response notification.

The transmission control unit 103 controls the transmission of the echo request from the request transmission unit 101. The transmission control unit 103 may sequentially transmit echo requests from the request transmission unit 101 to the plurality of end nodes 20 at predetermined timings such as periodical times. Further, when the response receiving unit 102 receives the echo response from the end node 20, the transmission control unit 103 controls the request transmitting unit 101 to send an echo request, having a value different from the echo request previously transmitted to the end node 20, to the end node 20. As a result, when the response receiving unit 102 receives the echo response from the end node 20, the request transmitting unit 101 sends an echo request, having a value different from that of the echo request previously transmitted to the end node 20, to the end node 20.

The value different from the echo request transmitted last time may be, for example, the value of the payload in the ICMP packet. The value of the payload may be the payload length or the like, alternatively, may be the value of the binary data in the "data" field. In addition to the payload value, the ID value and the sequence number value in the ICMP message may be used. When the payload value is used, it is possible to switch the echo request value depending on whether or not the echo response is received without changing the ID.

<Outline Configuration of End Node 20>

Figure 4:
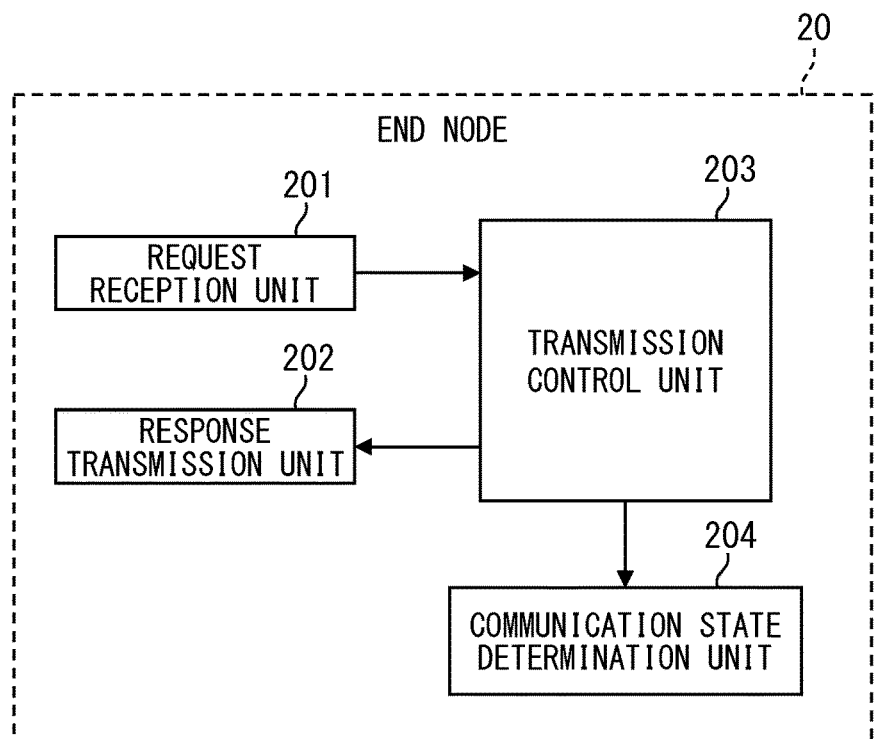
FIG. 4 is a diagram showing an example of a schematic configuration of an end node.

Subsequently, the schematic configuration of the end node 20 will be described with reference to FIG. 4. In FIG. 4, for convenience, configurations other than those related to the processing related to the determination of the communication state of the in-vehicle network are not shown. The end node 20 includes a request reception unit 201, a response transmission unit 202, a transmission control unit 203, and a communication state determination unit 204 as functional blocks. A part or all of the functions executed by the end node 20 may be configured in hardware by one or multiple ICs or the like. A part or all of the functional blocks included in the relay device 10 may be realized by a combination of execution of software by a processor and hardware members.

The request receiving unit 201 receives the echo request transmitted from the relay device 10. The request receiving unit 201 receives the echo request when the echo request is transmitted from the relay device 10. When the request receiving unit 201 can receive the echo request, the response transmitting unit 202 transmits the echo response to the relay device 10 which is directly connected thereto.

The transmission control unit 203 controls the transmission of the echo response from the response transmission unit 202. When the request receiving unit 201 can receive the echo request transmitted from the relay device 10, the transmission control unit 203 causes the response transmission unit 202 to transmit the echo response to the relay device 10.

The communication state determination unit 204 determines whether or not there is an abnormality in the communication state of the in-vehicle network. As an example, the communication state determination unit 204 may determine the communication state between the relay device 10 directly connected to its own end node 20 and its own end node 20 as the communication state of the in-vehicle network.

The communication state determination unit 204 determines that there is no abnormality in the communication status of the in-vehicle network when the value of the previous echo request received by the request receiving unit 201 before the response transmitting unit 202 transmits the echo response does not match the value of the current echo request received by the request receiving unit 201 after the response transmitting unit 202 transmits the echo response. On the other hand, when the values for these packets match, it is determined that there is an abnormality in the communication status of the in-vehicle network.

<Determination Related Processing on the Relay Device Side in the Relay Device 10>

Figure 5:
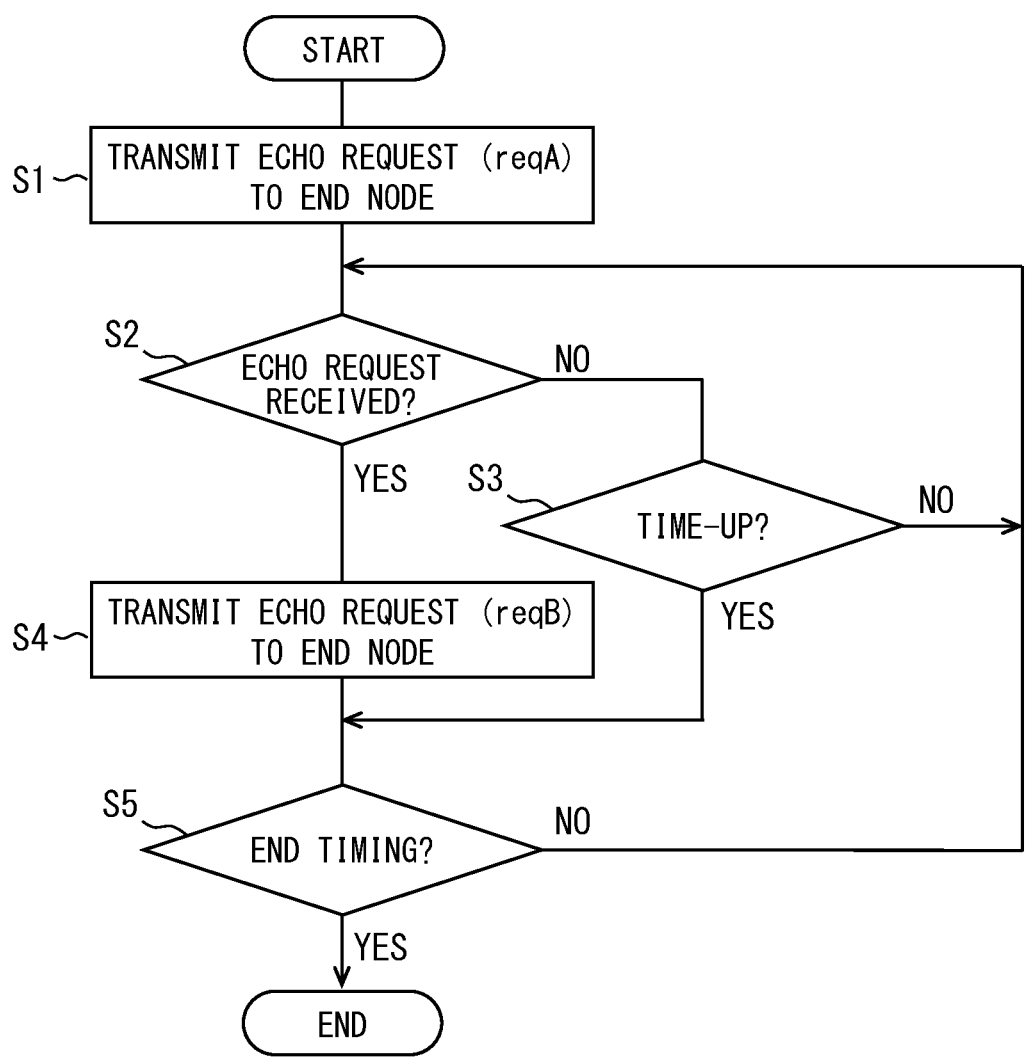
FIG. 5 is a flowchart showing an example of a flow of determination-related processing on the relay device side in the relay device.

Here, an example of the flow of the relay device-side determination-related processing in the relay device 10 will be described with reference to the flowchart of FIG. 5. The flowchart of FIG. 5 may be configured to start periodically, for example. the execution of the steps included in the relay device-side determination-related processing corresponds to the execution of the communication method.

First, in step S1, the request transmission unit 101 transmits an echo request to the end node 20 which is directly connected by the communication line. The echo request at this time is defined as reqA. As an example, the request transmission unit 101 may sequentially transmit echo requests reqA to two end nodes 20 among a plurality of end nodes 20 directly connected to the relay device 10.

In step S2, when the response receiving unit 102 receives the echo response from the end node 20 (i.e., YES in S2), the process proceeds to step S4. On the other hand, when the response receiving unit 102 does not receive the echo response from the end node 20 (i.e., NO in S2), the process proceeds to step S3.

In step S3, when the elapsed time from transmitting the echo request reqA to the end node 20 has reached the set time (i.e., YES in S3), the process proceeds to step S5. The elapsed time may be measured by the timer circuit. The set time can be predetermined arbitrarily. On the other hand, when the time is not up (i.e., NO in S3), the process returns to S2 and the process is repeated.

In step S4, the transmission control unit 103 controls the request transmission unit 101 to send the echo request, having a value different from the echo request reqA previously transmitted to the end node 20, to the end node 20 that received the echo response in S2. An echo request having a value different from that of the echo request reqA is referred to as reqB.

In step S5, in the case of the end timing of the relay device side determination-related processing (i.e., YES in S5), the relay device-side determination-related processing is terminated. On the other hand, when it is not the end timing of the relay device side determination-related processing (i.e., NO in S5), the process returns to S2 and the processing is repeated. As an example of the end timing of the determination-related processing on the relay device side, there is a case where the echo request reqB is transmitted in S4 to all of multiple end nodes 20 to which the echo request reqA is transmitted at S1, or a case where NO is set in S3. When it is not the end timing of the determination related processing on the relay device side, the processing is repeated until the echo request reqB is transmitted in S4 to all of multiple end nodes 20 to which the echo request reqA is transmitted at S1, or NO is set in S3.

The relay device side determination-related processing may be configured such that the above described processing is sequentially performed for all the combinations by changing the combination of two end nodes 20 among the plurality of end nodes 20 directly connected to the relay device 10. Further, the relay device side determination-related processing may be configured such that the echo request reqA is sequentially transmitted in S1 for all the end nodes 20 directly connected to the relay device 10 and the subsequent processing is performed.

<State Determination Related Processing in In-Vehicle Communication System 1>

Figure 6:
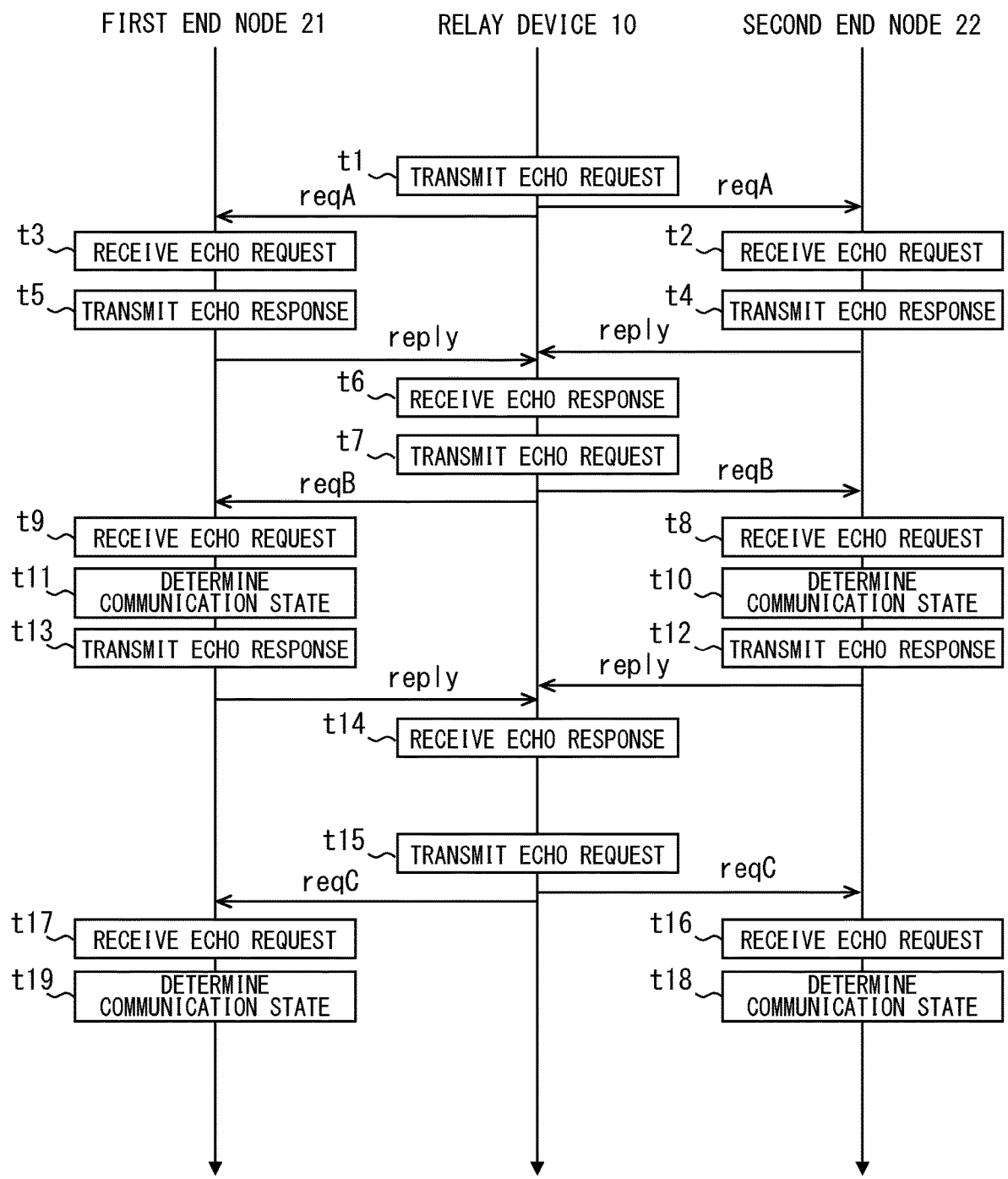
FIG. 6 is a sequence diagram showing an example of a flow of a state determination-related processing in the in-vehicle communication system.

Subsequently, an example of the flow of the process related to the determination of the communication state of the in-vehicle network in the in-vehicle communication system 1 (hereinafter, the state determination-related process) will be described with reference to the sequence diagram of FIG. 6. In the example of FIG. 6, two end nodes 20 among the plurality of end nodes 20 will be described as the first end node 21 and the second end node 22. In the example of FIG. 6, an example of the processing flow when there is no abnormality in the communication state between the relay device 10 and the first end node 21 and the second end node 22 is shown. In the example of FIG. 6, for convenience, the description will be limited to the combination of the first end node 21 and the second end node 22 among the plurality of end nodes 20.

First, at t1, the relay device 10 sequentially transmits the echo request reqA to the first end node 21 and the second end node 22. At t2 and t3, the first end node 21 and the second end node 22 each receive the echo request reqA transmitted from the relay device 10. At t4 and t5, the first end node 21 and the second end node 22 each transmit an echo response reply to the relay device 10.

At t6, the relay device 10 receives the echo response reply transmitted from the first end node 21 and the second end node 22, respectively. At t7, the relay device 10 sequentially transmits the echo request reqB having a value different from the echo request reqA transmitted last time to the first end node 21 and the second end node 22.

At t8 and t9, the first end node 21 and the second end node 22 each receive the echo request reqB transmitted from the relay device 10. At t10 and t11, each of the first end node 21 and the second end node 22 compares the echo request reqA received last time with the echo request reqB received the present time, respectively. Then, since the echo request reqA received last time and the echo request reqB received the present time do not match, it is determined that there is no abnormality in the communication state with the relay device 10. The feature that there is no abnormality in the communication state with the relay device 10 as used herein means that information can be transmitted to the relay device 10 and information can be received from the relay device 10.

At t12 and t13, the first end node 21 and the second end node 22 each transmit an echo response reply to the relay device 10. At t14, the relay device 10 receives the echo response reply transmitted from the first end node 21 and the second end node 22, respectively. At t15, the relay device 10 sequentially transmits the echo request reqC having a value different from the echo request reqB transmitted last time to the first end node 21 and the second end node 22.

At t16 and t17, the first end node 21 and the second end node 22 each receive the echo request reqC transmitted from the relay device 10. At t18 and t19, each of the first end node 21 and the second end node 22 compares the echo request reqB received last time with the echo request reqC received the present time, respectively. Then, since the echo request reqB received last time and the echo request reqC received the present time do not match, it is determined that there is no abnormality in the communication state with the relay device 10.

As shown in FIG. 6, in the in-vehicle communication system 1, it is possible to perform three transmissions/receptions of t3, t5, and t9 for the first time before the first end node 21 determines the communication state of the in-vehicle network. Further, from the second time and subsequent times, it is possible to complete the transmission and reception twice at t13 and t17. By the time the second end node 22 determines the communication state of the in-vehicle network, the transmission/reception of three times at t2, t4, and t8 for the first determination time can be completed. Further, from the second determination time and subsequent determination times, it is possible to complete the transmission and reception twice at t12 and t16. This is a smaller number of transmissions/receptions as compared with the conceivable technique of determining the communication status between end nodes. Hereinafter, an example of processing for determining the communication state of the in-vehicle network in this conceivable technique will be described.

<Communication Determination Processing Using Conceivable Technique>

Figure 7:
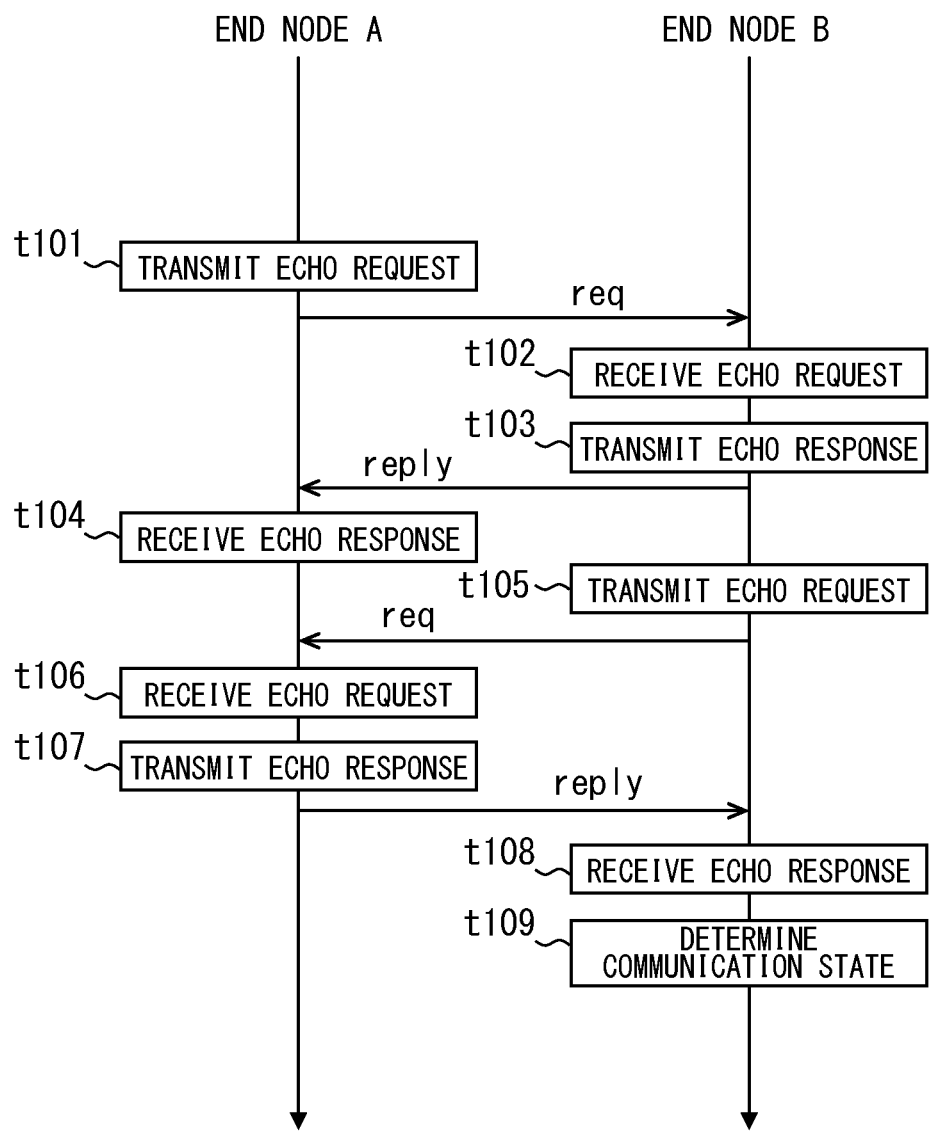
FIG. 7 is a sequence diagram showing an example of a process flow for determining a communication state between end nodes in a conceivable technique.

Subsequently, an example of the process flow of determining the communication state of the in-vehicle network in the conceivable technique for determining the communication state between the end nodes will be described with reference to the sequence diagram of FIG. 7. In the example of FIG. 7, an example in which the end node B determines the communication state with the end node A is shown. In the example of FIG. 7, an example of the processing flow when there is no abnormality in the communication state between the end node A and the end node B is shown.

First, at t101, the end node A transmits an echo request req to the end node B. At t102, the end node B receives the echo request req transmitted from the end node A. At t103, the end node B transmits an echo response reply to the end node A. At t104, the end node A receives the echo response reply transmitted from the end node B.

At t105, the end node B transmits an echo request req to the end node A. At t106, the end node A receives the echo request req transmitted from the end node B. At t107, the end node A transmits an echo response to the end node B. At t108, the end node B receives the echo response transmitted from the end node A. At t109, the end node B determines that there is no abnormality in the communication state with the end node A based on the feature that the end node B can receive the echo request and the echo response from the end node A.

As shown in FIG. 7, in the conceivable technique, four transmissions/receptions at t102, t103, t105, and t108 are required before the end node B determines the communication state of the in-vehicle network. Therefore, in the in-vehicle communication system 1, the number of transmissions and receptions until the communication state of the in-vehicle network is determined is smaller than that in the conceivable technique.

<Summary of Embodiment 1>

According to the configuration of the first embodiment, as described above, the number of transmissions/receptions until one end node 20 determines the communication state of the in-vehicle network is less than the number of transmissions/receptions until the end nodes determine the communication status of the in-vehicle network to each other. As a result, it becomes possible to determine the communication status of the in-vehicle network by individual end node more quickly than a case where the communication status of the in-vehicle network is determined between the end nodes. By making it possible to determine the communication status of the end node more quickly, it is possible to self-recover the end node more quickly in the event of an abnormality. For example, an example of self-recovery includes restarting.

Further, when the communication state of the in-vehicle network is determined between the end nodes, an increase in the number of communication paths required for determining the communication state becomes a difficulty. On the other hand, according to the configuration of the first embodiment, each of the plurality of relay devices 10 is directly connected to the plurality of end nodes 20, and each of the end nodes 20 determines the communication state of the in-vehicle network with the relay device 10. Therefore, it is possible to suppress the number of communication paths required to determine the communication status of the in-vehicle network.

Figures 8, 9:
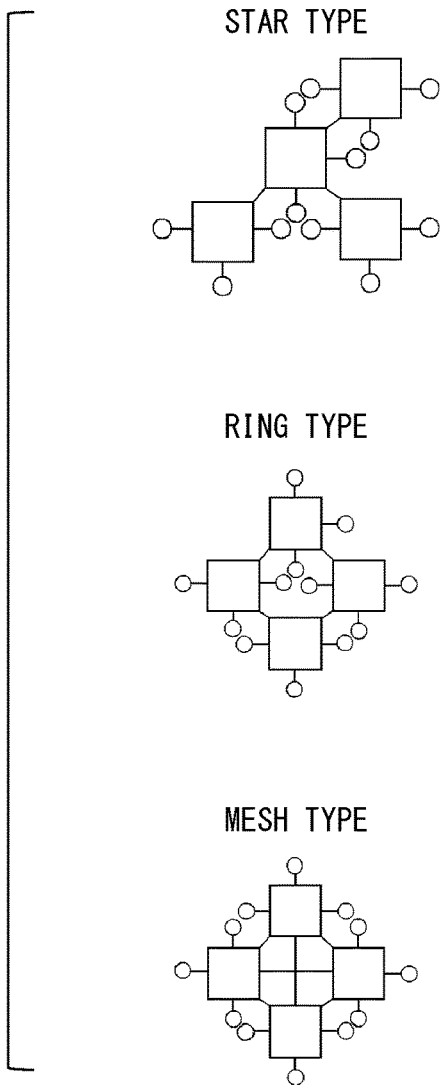
FIG. 8 is a diagram for explaining an example of the effect of reducing the number of required communication paths by the configuration of the first embodiment.
FIG. 9 is a diagram showing an example of a connection mode between relay devices.

Here, an example of the effect of reducing the number of required communication paths by the configuration of the first embodiment will be described with reference to FIG. 8. FIG. 8 shows the number of routes required in the in-vehicle communication system 1 and the number of routes required in the conceivable technique with respect to the combination of the number of relay devices 10 and the number of end nodes 20. In the example of FIG. 8, a case where three end nodes 20 are directly connected to one relay device 10 respectively will be described as an example.

The required number of routes in the in-vehicle communication system 1 is obtained by adding up the number of routes between the relay device 10 and the end nodes 20 and the number of routes between the relay devices 10. On the other hand, the required number of routes in the conceivable technique can be obtained from the number of routes between the end nodes 20. Therefore, for example, in the case where the number of relay devices 10 is four and the number of end nodes 20 is 12, the required number of routes in the in-vehicle communication system 1 can be obtained by calculating an equation of $3\times4+{_4}C_2$ (that is, 2 of combination 4). On the other hand, the required number of routes in the conceivable technique can be obtained by calculating ${_{12}}C_2$ (that is, 2 of combination 12). The required number of routes is the same value regardless of the connection form between the relay devices 10 such as the star type, the ring type, and the mesh type shown in FIG. 9. The square in FIG. 9 indicates the relay device 10, and the circle indicates the end node 20.

As shown in FIG. 8, when there are two relay devices 10 and six end nodes 20, the required number of routes in the in-vehicle communication system 1 is 4, and the required number of routes in the conceivable technique is 15. When there are three relay devices 10 and nine end nodes 20, the number of required routes in the in-vehicle communication system 1 is 11, and the number of required routes in the conceivable technique is 36. When there are four relay devices 10 and twelve end nodes 20, the number of required routes in the in-vehicle communication system 1 is 18, and the number of required routes in the conceivable technique is 66. When the relay device 10 is 10 and the end node 20 is 30, the required number of routes in the in-vehicle communication system 1 is 75, and the required number of routes in the conceivable technique is 435. As described above, according to the configuration of the first embodiment, it is possible to reduce the number of required routes as compared with the case where the communication state of the in-vehicle network is determined between the end nodes.

Second Embodiment

In the first embodiment, a configuration in which a plurality of relay devices 10 are included in the in-vehicle communication system 1 is shown, but the present embodiment may not be necessarily limited to this. For example, as shown in FIG. 10, the in-vehicle communication system 1a may include only one relay device 10 (hereinafter, according to the second embodiment).

Figure 10:
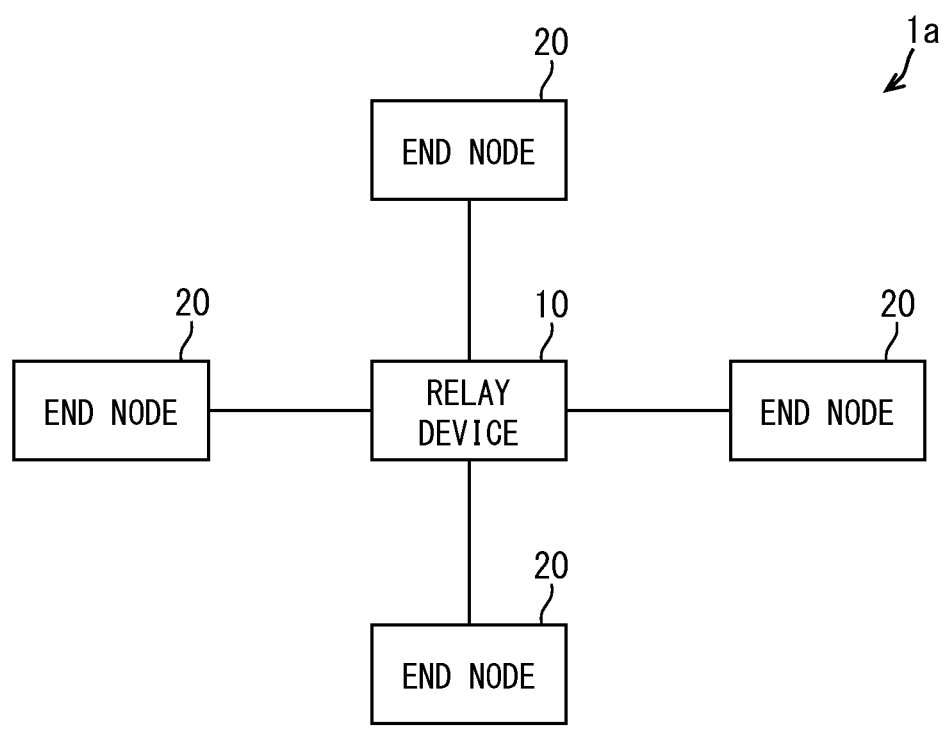
FIG. 10 is a diagram showing an example of a schematic configuration of an in-vehicle communication system.

As shown in FIG. 10, the in-vehicle communication system 1a includes one relay device 10 and a plurality of end nodes 20. The in-vehicle communication system 1a is similar to the in-vehicle communication system 1 of the first embodiment, except that the number of relay devices 10 included is different. FIG. 10 shows an example in which one relay device 10 is directly connected to four end nodes 20 respectively.

Since the configuration of the second embodiment is similar to that of the first embodiment except for the number of relay devices 10, the number of transmissions and receptions at the end node 20 until the communication state of the in-vehicle network is determined is less than a case of determining the communication status of the in-vehicle network between end nodes, as in the first embodiment. As a result, it becomes possible to determine the communication status of the in-vehicle network by individual end node more quickly than a case where the communication status of the in-vehicle network is determined between the end nodes.

Further, in order to reduce the number of communication paths (that is, the required number of routes) required for determining the communication status of the in-vehicle network as compared with the case where the end nodes determine the communication status of the in-vehicle network to each other, the number of end nodes 20 directly connected to the relay device 10 may be preferably 4 or more. When the number of end nodes 20 directly connected to the relay device 10 is 4 or more, the number of required routes can be reduced as compared with the case where the end nodes determine the communication state of the in-vehicle network to each other.

The controller and the method thereof described in the present disclosure are implemented by a dedicated computer provided by configuring a processor and a memory programmed to execute one or more functions embodied by a computer program. Alternatively, the controller and the method described in the present disclosure may be implemented by a dedicated computer provided by configuring a processor with one or more dedicated hardware logic circuits. Alternatively, the controller and the method thereof described in the present disclosure are based on a combination of a processor and a memory programmed to execute one or more functions and a processor configured by one or more hardware logic circuits. It may be implemented by one or more configured dedicated computers. The computer programs may be stored, as instructions to be executed by a computer, in a tangible non-transitory computer-readable storage medium.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

Although the present disclosure has been described in accordance with embodiments, it is understood that the present disclosure is not limited to such embodiments or structures. The present disclosure also encompasses various modified examples and modifications within a uniform range. In addition, various combinations and forms, and further, other combinations and forms including only one element, or more or less than these elements are also within the spirit and the scope of the present disclosure.

What is claimed is:

1. An in-vehicle communication system for a vehicle comprising:
a plurality of end nodes as information processing devices disposed in an in-vehicle network; and
at least one relay device directly connected to the plurality of end nodes, wherein:
the at least one relay device includes:
a request transmission unit that transmits a failure detection packet, which is a packet for detecting a communication status, to each end node; and
a response reception unit that receives a response transmitted from at least one of the end nodes capable of receiving the failure detection packet;
when the response reception unit receives the response from the at least one of the end nodes, the request transmission unit transmits an other failure detection packet, having a value different from a value of a previous failure detection packet previously transmitted, to the at least one of the end nodes to which the previous failure detection packet is previously transmitted;
each end node includes:
a request reception unit that receives the failure detection packet transmitted from the at least one relay device;
a response transmission unit that transmits the response to the at least one relay device when the request reception unit can receive the failure detection packet; and
a communication state determination unit that determines that a communication status of the in-vehicle network is normal when the value of the previous failure detection packet received by the request reception unit before the response transmission unit transmits the response does not match the value of the other failure detection packet currently received by the request transmission unit after the response transmission unit transmits the response, and determines that the communication status of the in-vehicle network is not normal when the value of the previous failure detection packet matches the value of the other failure detection packet.

2. The in-vehicle communication system according to claim 1, wherein:
the at least one relay device is directly connected to four or more of the end nodes.

3. The in-vehicle communication system according to claim 1, wherein:
the at least one relay device includes a plurality of relay devices; and
each relay device is directly connected to at least a part of the plurality of end nodes.

4. The in-vehicle communication system according to claim 1, wherein:
the value of each failure detection packet is a value of a payload in the failure detection packet; and
when the response reception unit receives the response from the end node, the request transmission unit transmits the other failure detection packet having the value of the payload different from the previous failure detection packet previously transmitted.

5. The in-vehicle communication system according to claim 1, wherein:
the previous failure detection packet and the other failure detection packet are echo request notifications among notifications related to an Internet control notification protocol; and
the response is an echo response notification among the notifications related to the Internet control notification protocol.

6. The in-vehicle communication system according to claim 1, wherein:
the at least one relay device further includes:
one or more processors; and
a memory coupled to the one or more processors and storing program instructions that when executed by the one or more processors cause the one or more processors to provide at least: the request transmission unit; and the response reception unit; and
each end node further includes:
one or more processors; and
a memory coupled to the one or more processors and storing program instructions that when executed by the one or more processors cause the one or more processors to provide at least: the request reception unit; the response transmission unit; and the communication state determination unit.

7. A relay device for a vehicle directly connected to a plurality of end nodes as information processing devices included in an in-vehicle network, the relay device comprising:
a request transmission unit that transmits a failure detection packet, which is a packet for detecting a communication status, to each end node; and
a response reception unit that receives a response transmitted from at least one of the end nodes capable of receiving the failure detection packet, wherein:
when the response reception unit receives the response from the at least one of the end nodes, the request transmission unit transmits an other failure detection packet, having a value different from a value of a previous failure detection packet previously transmitted, to the at least one of the end nodes to which the previous failure detection packet is previously transmitted.

8. The relay device according to claim 7, further comprising:
one or more processors; and
a memory coupled to the one or more processors and storing program instructions that when executed by the one or more processors cause the one or more processors to provide at least: the request transmission unit; and the response reception unit.

9. A communication method comprising:
transmitting a failure detection packet, which is a packet for detecting a communication status, to each of a plurality of end nodes by a relay device directly connected to the plurality of end nodes as information processing devices included in an in-vehicle network;
transmitting a response to the relay device by each of the end nodes when each of the end nodes receives the failure detection packet transmitted from the relay device;
transmitting an other failure detection packet, having a value different from a value of a previous failure detection packet previously transmitted, by the relay device to at least one of the end nodes to which the previous failure detection packet is previously transmitted when the relay device receives the response from the at least one of the end nodes;
determining by the at least one of the end nodes that the communication status of the in-vehicle network is normal when the value of the previous failure detection packet received before transmitting the response does not match the value of the other failure detection packet currently received after transmitting the response; and
determining by the at least one of the end nodes that the communication status of the in-vehicle network is not normal when the value of the previous failure detection packet matches the value of the other failure detection packet.

* * * * *